United States Patent [19]

Werner

[11] Patent Number: 5,326,208
[45] Date of Patent: Jul. 5, 1994

[54] NUT FOR TURNING ONTO A THREADED STUD

[75] Inventor: Wolfgang Werner, Reutlingen, Fed. Rep. of Germany

[73] Assignee: Emhart Inc., Newark, Del.

[21] Appl. No.: 10,236

[22] Filed: Jan. 28, 1993

[30] Foreign Application Priority Data

Jan. 29, 1992 [DE] Fed. Rep. of Germany ....... 9201043

[51] Int. Cl.$^5$ ............................................. F16B 37/16
[52] U.S. Cl. ...................................... 411/437; 411/908
[58] Field of Search ............... 411/301, 302, 386, 427, 411/437, 908

[56] References Cited

U.S. PATENT DOCUMENTS

| | | | |
|---|---|---|---|
| 3,075,272 | 1/1963 | Buyken | 411/437 X |
| 3,491,646 | 1/1970 | Tinnerman | 411/437 X |
| 4,299,520 | 11/1981 | Iwata | 411/437 |
| 4,889,460 | 12/1989 | Laidlaw et al. | 411/437 |
| 4,907,930 | 3/1990 | Peterson | 411/437 |

FOREIGN PATENT DOCUMENTS

| | | |
|---|---|---|
| 2802465 | 7/1979 | Fed..Rep. of Germany . |
| 9201043 | 4/1992 | Fed. Rep. of Germany . |
| 2204244 | 5/1974 | France . |
| 2219699 | 9/1974 | France . |

Primary Examiner—Neill R. Wilson
Attorney, Agent, or Firm—Edward D. Murphy

[57] ABSTRACT

A nut for turning onto a threaded stud and having a smooth bore extending from an inwardly-tapering conical lead-in area, the nut being characterized in that in the lead-in area a stripping zone is formed by a plurality of parallel tubular cavities of smaller diameter than the bore of the nut, in that the cavities are spaced apart and arranged symmetrically about the axis of the bore of the nut, in that the axis of each tubular cavity is spaced from the axis of the bore of the nut by a distance smaller than the sum of the radii of the tubular cavity and of the bore and greater than the radius of the bore, in that the intersections of the walls of each tubular cavity with the wall of the bore of the nut form cutting edges, and in that the respectively adjacent tubular cavities are linked to one another via cavities provided therebetween so that a coating stripped from the threaded stud as the nut is turned onto the stud can be accommodated in this cavity.

Preferably, the nut has three tubular cavities which are linked together by three linking cavities.

10 Claims, 1 Drawing Sheet

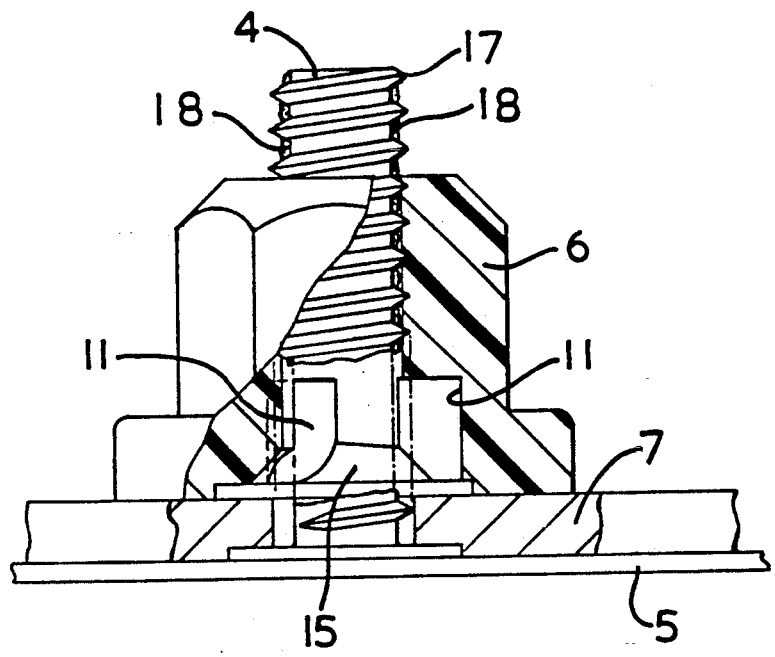
Fig_1
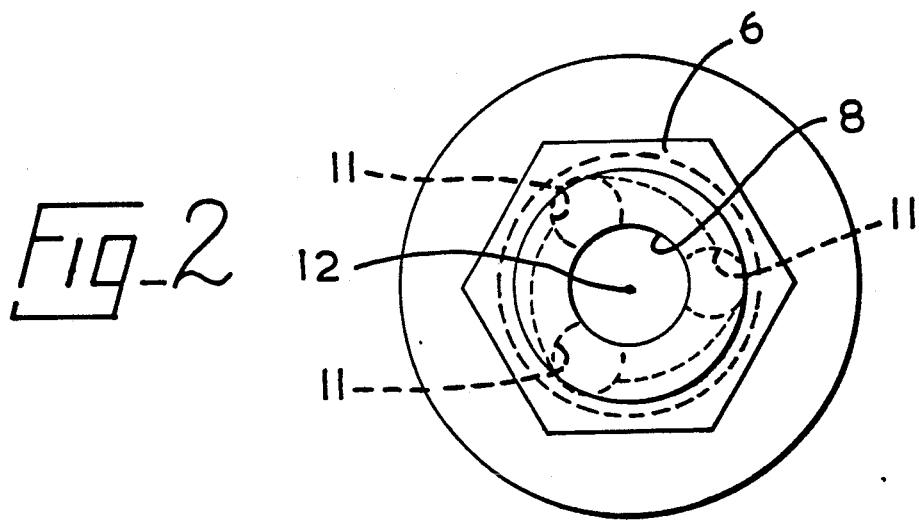
Fig_2
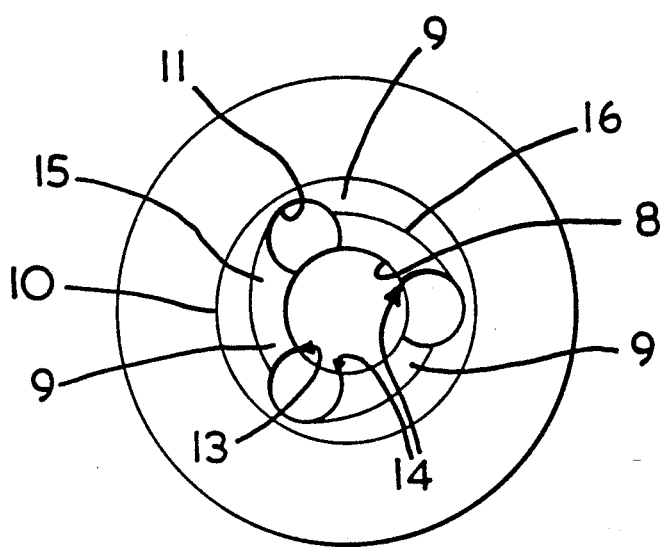
Fig_3

NUT FOR TURNING ONTO A THREADED STUD

BACKGROUND OF THE INVENTION

The invention relates to a plastics nut for turning onto a threaded stud, particularly a weld stud, and having a smooth bore extending from an inwardly-tapering conical lead-in area.

Plastics nuts such as collar nuts or cap nuts are known which may be turned onto a threaded stud and are provided with a smooth internal bore extending from an inwardly-tapering conical lead-in portion. When such a nut is turned onto a threaded stud, a thread is formed in the bore of the nut. Such a collar nut is described in German Patent specification DE 28 02 465. This discloses a collar nut which is further provided with axial grooves in order to displace any material cut away by the formation of the thread in the bore of the nut and occasional paint residues left on the thread of the stud.

The stud may, however, be subjected to more than occasional residues so that it is heavily coated with paint or other surface treatment agents. For example, motor car bodies are treated to inhibit rust (underseal-ing) usually after the threaded studs have been welded to the untreated vehicle body. Many problems arise if a plastics nut is screwed onto a threaded stud coated wholly or partly with paint or underseal material. The thread formed in the bore of the nut may be imperfect and an increased torque must be applied to the nut in order to form the internal thread.

The quantity of the underseal coat inevitably varies from stud to stud so that the torque required to tighten each nut varies and this is not a welcome requirement on an assembly line, particularly an automated assembly line. Furthermore, the torque required may exceed a pre-set torque limit so that screwing is terminated before the nut is screwed fully home and the nut may not abut the component to be secured by the screw. Additionally, imperfect thread formation in the bore of the nut may affect the friction values between the nut and the threaded stud in an unacceptable way.

A collar nut to overcome these problems is described in our German Gebrauchsmuster G84 175 583 wherein a component is provided with a bore and can be turned onto a threaded stud sprayed with a tough coating. The bore is provided with a smooth inner wall and with a substantially conical lead-in area, sharp-edged projections being provided within the lead-in area for removing the coating when being screwed on, these projections being directed toward the axis of the weld stud and extending radially generally up to the diameter of the bore.

The invention relates to a stripping nut for turning onto a threaded stud which has a simplified design making manufacture easier and cheaper whilst achieving the effectiveness of the nut described above.

BRIEF DESCRIPTION OF THE INVENTION

According to the present invention there is provided a nut for turning onto a threaded stud and having a smooth bore extending from an inwardly-tapering conical lead-in area, the nut being characterised in that in the lead-in area a stripping zone is formed by a plurality of parallel tubular cavities of smaller diameter than the bore of the nut, in that the cavities are spaced apart and arranged symmetrically about the axis of the bore of the nut, in that the axis of each tubular cavity is spaced from the axis of the bore of the nut by a distance smaller than the sum of the radii of the tubular cavity and of the bore and greater than the radius of the bore, in that the intersections of the walls of each tubular cavity with the wall of the bore of the nut form cutting edges, and in that the respectively adjacent tubular cavities are linked to one another via linking cavities provided therebetween so that a coating stripped from the threaded stud as the nut is turned onto the stud can be accommodated in these cavities.

The nut is advantageously designed such that the linking cavities linking the adjacent tubular cavities to one another are limited by curved outer wall portions and in that each curved wall portion has, at the lead-in end of the nut, an outer circumference of which one end rests tangentially on an outer point, at the greatest distance from the central axis of the bore, of each tubular cavity, its other end striking the circumference of the adjacent tubular cavity at a point which is at a distance from the central axis of the bore substantially equal to the sum of the radii of the bore and of the tubular cavity.

In a preferred embodiment, the nut has three tubular cavities which are linked together by three linking cavities.

The depth of the tubular cavities is a fraction of the length of the bore of the nut. The depth of the linking cavities may be equal to that of the tubular cavities, but it may be preferable for the depth of the linking cavities to be smaller than that of the tubular cavities.

BRIEF DESCRIPTION OF THE DRAWINGS

In order that the invention be better understood, a preferred embodiment will now be described in greater detail by way of example with reference to the accompanying drawings in which:

FIG. 1 as a partially broken away side view of a plastics nut on a weld stud,

FIG. 2 as a plan view of the nut shown in FIG. 1, and

FIG. 3 as an underside view of the nut shown in FIG. 1.

DETAILED DESCRIPTION OF EMBODIMENT AND DRAWINGS

FIG. 1 shows a threaded weld stud 4, which is welded to a carrier sheet 5, and a plastics collar nut 6, which is screwed onto stud 4 and secures a component 7 on the carrier sheet 5. The collar nut 6 is provided with a smooth bore 8, and a conical lead-in zone 9 produces a wide-mouth entry 10 leading to the bore 8. Three short tubular cavities 11 having a diameter smaller than the diameter of bore 8 are arranged symmetrically around bore 8, the axis of each tubular cavity 11 being located parallel to the axis 12 of the bore 8 and spaced from the axis 12 by a distance smaller than the sum of the radii of bore 8 and of the tubular cavity 11 so that longitudinal cutting edges 13, 14 are formed at the intersections of the walls of the tubular cavities 11 with the bore 8.

Between each tubular cavity 11 there is located a linking cavity 15 having a depth smaller than the depth of the tubular cavities and having a wall 16 which is curved in the form of a crescent and extends from the point of one bore 11 furtherest removed from the bore axis 12 and impinges on the adjacent bore 11 at an intermediate location.

The tubular cavities 11 and the linking cavities 15 are located within the circumference of wide-mouth entry 10.

The nut 6 is placed onto the stud 4 by a screwing action which causes the cutting edges 13, 14 to scrape the surface of stud 4 so that any deposit of sealant or paint is removed from the stud. The material is removed from the crest 17 of the thread which thus has unrestricted contact with the plane bore 8 of the nut 6 as the nut is applied to the stud by screwing and a complementary thread is thereby cut in the bore 8. A small amount of material remains in the bases 18 of the thread. The material which has therefore been removed from the stud is accommodated in the tubular cavities 11 and the linking cavities 15.

Consequently, when the nut 6 is applied to the thus-cleaned stud 4, the resulting torque performance is consistent and does not fluctuate significantly from stud to stud.

I claim:

1. A nut for turning onto a threaded stud and having a smooth bore extending from an inwardly-tapering conical lead-in area, wherein, in said lead-in area, a stripping zone is formed by a plurality of parallel tubular cavities of smaller diameter than the bore of the nut characterized in that said cavities begin at openings in said conical lead-in area and extend therefrom, said cavities being spaced apart and arranged symmetrically about the axis of the bore of the nut, in that the axis of each tubular cavity is spaced from the central axis of the bore of the nut by a distance smaller than the sum of the radii of the tubular cavity and of the bore and greater than the radius of the bore, in that the intersection of the walls of each tubular cavity with the wall of the bore of the nut forms cutting edges, and in that the respectively adjacent tubular cavities are linked to one another via linking cavities provided therebetween so that a coating stripped from the threaded stud as the nut is turned onto the stud can be accommodated in these cavities.

2. A nut according to claim 1, wherein three parallel tubular cavities are linked to one another by three linking cavities.

3. A nut according to claim 1, wherein the depth of the linking cavities is equal to the depth of the tubular cavities.

4. A nut according to claim 1, wherein the tubular cavities, the linking cavities and the wall portions thereof are located within the circumference of the wide-mouth entry of the inwardly reducing conical lead-in face.

5. A nut for turning onto a threaded stud and having a smooth bore extending from an inwardly-tapering conical lead-in area, wherein, in the lead-in area, a stripping zone is formed by a plurality of parallel tubular cavities of smaller diameter than the bore of the nut in the cavities are spaced apart and arranged symmetrically about the axis of the bore of the nut, characterized in that the axis of each tubular cavity is spaced from the central axis of the bore of the nut by a distance smaller than the sum of the radii of the tubular cavity and of the bore and greater than the radius of the bore, in that the intersection of the walls of each tubular cavity with the wall of the bore of the nut forms cutting edges, and in that the respectively adjacent tubular cavities are linked to one another via linking cavities provided therebetween so that a coating stripped from the threaded stud as the nut is turned onto the stud can be accommodated in these cavities, wherein the cavities linking adjacent tubular cavities to one another are limited by curved out wall portions and in that each curved wall portion has, at the lead-in end of the nut, an outer circumference of which one end rests tangentially on an outer point, at the greatest distance from the central axis of the bore, of each tubular cavity, its other end striking the circumference of the adjacent tubular cavity at a point which is at a distance from the central axis of the bore substantially equal to the sum of the radii of the bore and of the tubular cavity.

6. A nut for turning onto a threaded stud and having a smooth bore extending from an inwardly-tapering conical lead-in area, wherein, in the lead-in area, a stripping zone is formed by a plurality of parallel tubular cavities of smaller diameter than the bore of the nut in the cavities are spaced apart and arranged symmetrically about the axis of the bore of the nut, characterized in that the axis of each tubular cavity is spaced from the central axis of the bore of the nut by a distance smaller than the sum of the radii of the tubular cavity and of the bore and greater than the radius of the bore, in that the intersection of the walls of each tubular cavity with the wall of the bore of the nut forms cutting edges, and in that the respectively adjacent tubular cavities are linked to one another via linking cavities provided therebetween so that a coating stripped from the threaded stud as the nut is turned onto the stud can be accommodated in these cavities, wherein the depth of the tubular cavity is a fraction of the length of the bore of the nut.

7. A stripping nut adapted to be rotationally engaged with a threaded stud which may have coating deposited on the exterior surface thereof, said stripping nut being adapted to remove at least a portion of the coating and to accommodate the removed coating within the nut as the nut is rotated onto the stud, said nut comprising a body having a cylindrical bore therethrough and an end surface at one end of said bore for engaging a component to be retained by said nut;

said end surface including a conical portion concentric with said bore and tapering inwardly from the end of said body into said bore;

a plurality of axial cavities spaced symmetrically about the axis of said bore, said cavities beginning in said conical portion and extending beside said bore for a portion of the length of said bore;

the circumference of each of said cavities intersecting the circumference of said bore to provide edges at said intersections for removal of deposit from the stud; and linking cavities extending radially between and connecting said axial cavities to provide for the transfer of excess quantities of removed deposit from one of said axial cavities to another.

8. A stripping nut as claimed in claim 7 wherein said linking cavities are located at the beginning of said axial cavities and open into said conical portion of said end surface.

9. A stripping nut as claimed in claim 7 wherein said linking cavities are tapered from one end to the other to accommodate an increasing quantity of deposit as said nut is rotated.

10. A stripping nut as claimed in claim 7 wherein the radial extent of said axial cavities and said linking cavities measured from the axis of said bore is less than the radius of said conical portion of said end surface.

* * * * *